United States Patent
Wu

(10) Patent No.: US 7,036,057 B2
(45) Date of Patent: Apr. 25, 2006

(54) RANGE SPLITTING READ/WRITE METHODS FOR CD-MRW

(75) Inventor: Tse-Hong Wu, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 461 days.

(21) Appl. No.: 10/064,412

(22) Filed: Jul. 11, 2002

(65) Prior Publication Data

US 2004/0010738 A1    Jan. 15, 2004

(51) Int. Cl.
*G11C 29/00*    (2006.01)

(52) U.S. Cl. .......................... 714/723; 714/8

(58) Field of Classification Search ............. 714/723, 714/718, 699, 9, 8, 5, 3; 369/53.15, 59.26
See application file for complete search history.

(56) References Cited

U.S. PATENT DOCUMENTS

| 6,021,101 | A  | * | 2/2000  | Satoh ............... 369/30.1 |
| 6,108,289 | A  | * | 8/2000  | Hashimoto ......... 369/59.26 |
| 6,493,301 | B1 | * | 12/2002 | Park ............... 369/53.15 |
| 2002/0029357 | A1 | * | 3/2002 | Charnell et al. ....... 714/9 |

FOREIGN PATENT DOCUMENTS

TW    449685    8/2001

* cited by examiner

*Primary Examiner*—Guy Lamarre
*Assistant Examiner*—Dipakkumar Gandhi
(74) *Attorney, Agent, or Firm*—Winston Hsu

(57) ABSTRACT

The invention provides read/write methods for a CD-MRW (Mount Rainier ReWrite). The read/write methods split a read-block or write-packet range in to several sub-ranges to simplify the complexity of the related read/write procedures and reduce the required capacity of DRAM buffer for the read/write procedures of the CD-MRW. The sub-ranges are continuous, partial, or defect ranges of packets or blocks.

15 Claims, 7 Drawing Sheets

RANGE SPLITTING READ/WRITE METHODS FOR CD-MRW

BACKGROUND OF INVENTION

1. Field of the Invention

The present invention relates in general to read/write methods for CD-MRW (Mount Rainier ReWrite), and more particularly, to read/write methods which split a read-block or write-packet range into several sub-ranges to reduce the size of DRAM buffer required for the read/write procedures of CD-MRW.

2. Description of the Prior Art

Over the past few years, storage media have rapidly increased in capacity due to increasing demand for storing tremendous amounts of information. Of all various kinds of storage media, optical discs are a low-cost, small-size, low-error-rate, long-storage-time, and high-density storage medium and are the most promising storage medium for the future. Optical discs mainly fall into two categories: compact disc (CD) and digital versatile disc (DVD). Compact discs further fall into several categories such as: CD-Interactive (CD-I), CD-Recordable (CD-R), CD-Erasable (CD-E), CD-Read Only Memory (CD-ROM), CD-Plus, and CD-Rewritable (CD-RW), and CR-MRW.

Based on these various kinds of CDs, some optical disc standards have been created such as a Red Book for storage standards of music and image frames, a Book for storage standards of digital data, a Green Book for storage standards of animation, an Orange Book for storage standards of rewritable discs, and a Blue Book for storage standards of hybrid data formats. Thereafter, manufacturers can fabricate various kinds of optical discs based on the abovementioned standards.

Among the different kinds of optical discs, the CD-MRW discis able to support defect management provided by multi-media command (MMC) set modifications. According to the specifications of CD-MRW, a data area (DA) is composed of 136 packets and a spare area (SA) is composed of 8 packets. Furthermore, each packet is composed of 32 data blocks, a link block, and a plurality of run-in and run-out blocks. A block is the smallest reading unit and a packet is the smallest writing unit. When a DA contains a defect block, data in the packet of an SA associated with the defect block is read to revise the corresponding block and then write the whole packet back to the SA. Therefore, the advantage of defect management is undermined by the complexity of the read/write procedures.

SUMMARY OF INVENTION

It is therefore a primary objective of the present invention to provide read/write methods for CD-MRW to simplify the complexity of the related procedures.

According to the present invention, a writing method for CD-MRW comprises: (a) obtaining data to be written to a CD-MRW substrate; (b) determining a write packet range of the data; (c) identifying any defect blocks in the write packet range; (d) identifying breakpoints in the write packet range based on the defect blocks; (e) splitting the write packet range into at least two sub-ranges based on the breakpoints; and (f) individually writing each sub-range. A corresponding reading method for CD-MRW comprises: (a) determining a read block range of the data; (b) identifying any defect blocks in the read block range; (c) identifying breakpoints in the read block range based on the defect blocks; (d) splitting the read block range into at least two sub-ranges based on the breakpoints; and (e) individually reading each sub-range.

It is a major advantage of the present invention that the range split methods simplify the complexity of the related read/write procedures and reduce the required capacity of DRAM buffer required for the read/write procedures of a CD-MRW.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
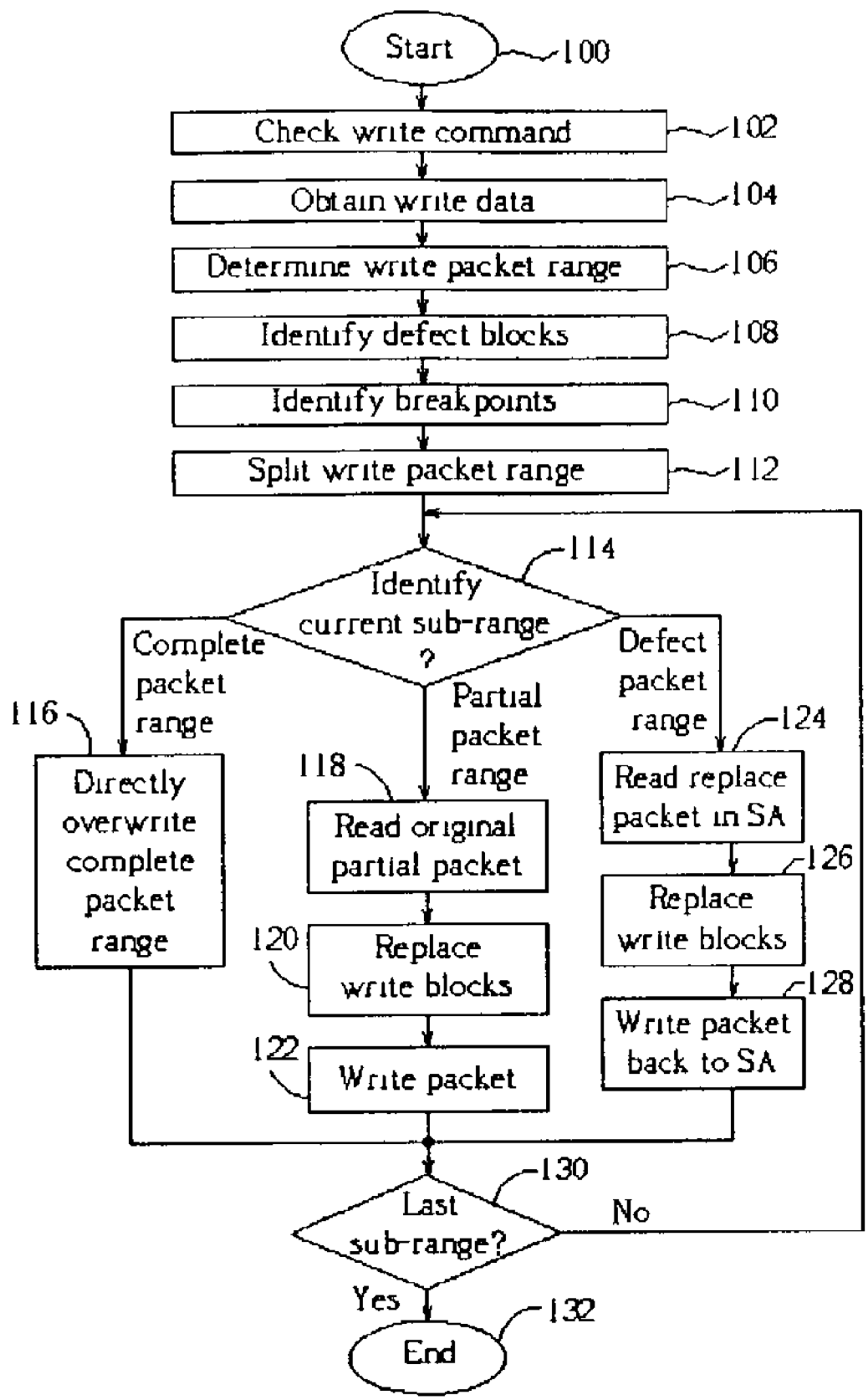
FIG. 1 shows a flowchart of a writing method for a CD-MRW according to the preferred embodiment of the present invention.

Please refer to FIG. 1. The writing method for a CD-MRW according to one preferred embodiment of the present invention is shown as a flowchart in FIG. 1. After receiving a write command by a host computer, the host computer obtains write data and determines a write packet range. The write range is based on a packet as a range unit because a packet is the smallest writing unit. Then, a plurality of defect blocks related to the write packet range is identified through a main defect table (MDT) located in a main table area (MTA) within a lead-in area of a data track on an optical disc. The writing method of FIG. 1 is summarized as follows:

Step 100: Start;

Step 102: Check the write command, and verify that it is valid and has no errors;

Step 104: Obtain data to be written to the CD-MRW;

Step 106: Determine the write packet range of the data;

Step 108: Identify defect blocks in the write packet range;

Step 110: Identify breakpoints in the write packet range based on the defect blocks;

Step 112:

Split the write packet range into at least two sub-ranges based on the breakpoints;

Step 114:

Identify the current sub-range. If the sub-rage is a complete packet range, go to step 116. If the sub-range is a partial packet range, go to step 118. If the sub-range is a defect packet range, go to step 124;

Step 116:

The sub-range is a complete packet range. Directly overwrite the complete packet range;

Step 118: The sub-range is a partial packet range. Read the original partial packet;

Step 120:

Replace corresponding write blocks in the original partial packet to generate a write packet;

Step 122: Write the entire write packet back over the original partial packet;

Step 124:

The sub-range is a defect packet range. Read a replace packet in a spare area (SA);

Step 126:

Replace corresponding write blocks in the replace packet to generate a modified replace packet;

Step 128: Write the modified replace packet back to the SA;

Step 130:

Is this the last sub-range to be written? If this is the last sub-range, go to step 132. If this is not the last sub-range, return to step 114;

Step 132: End.

Figure 2:
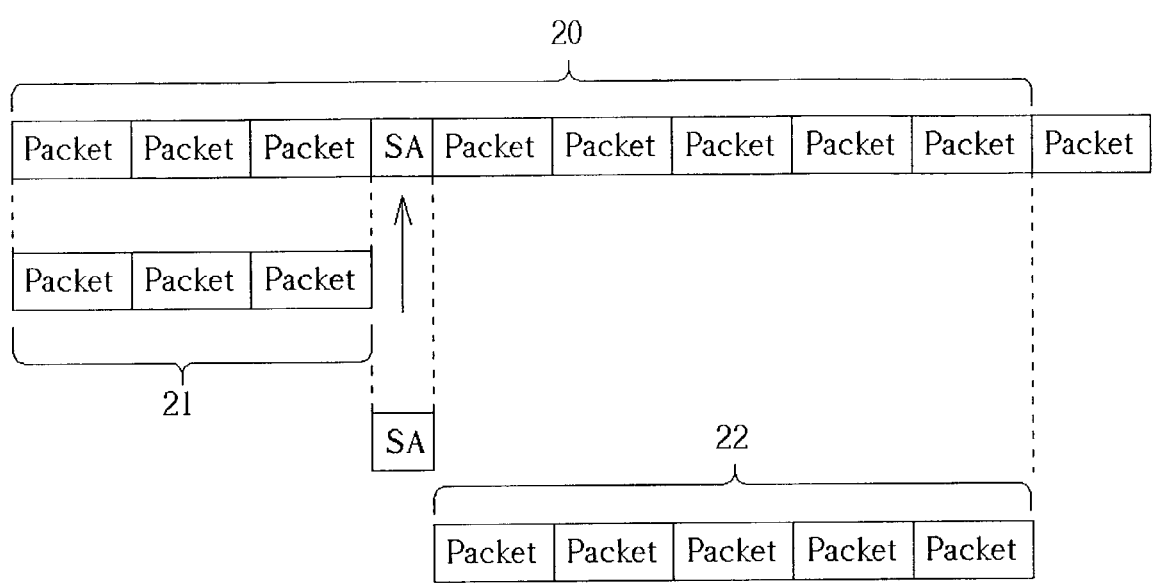
FIG. 2 shows a range split of a continuous complete packet range having an SA.
Figure 3:
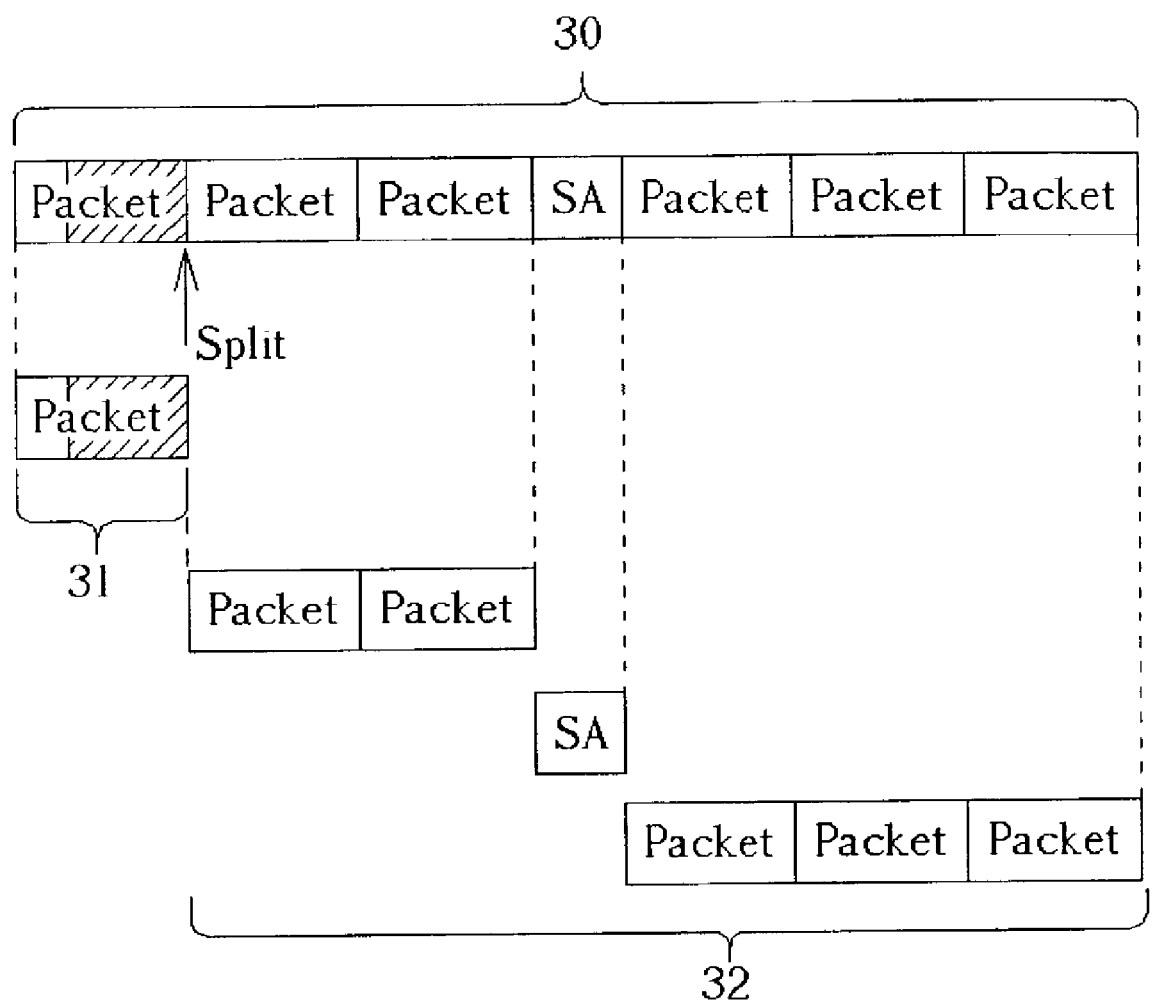
FIG. 3 shows a range split of a partial packet range having a partial packet.
Figure 4:
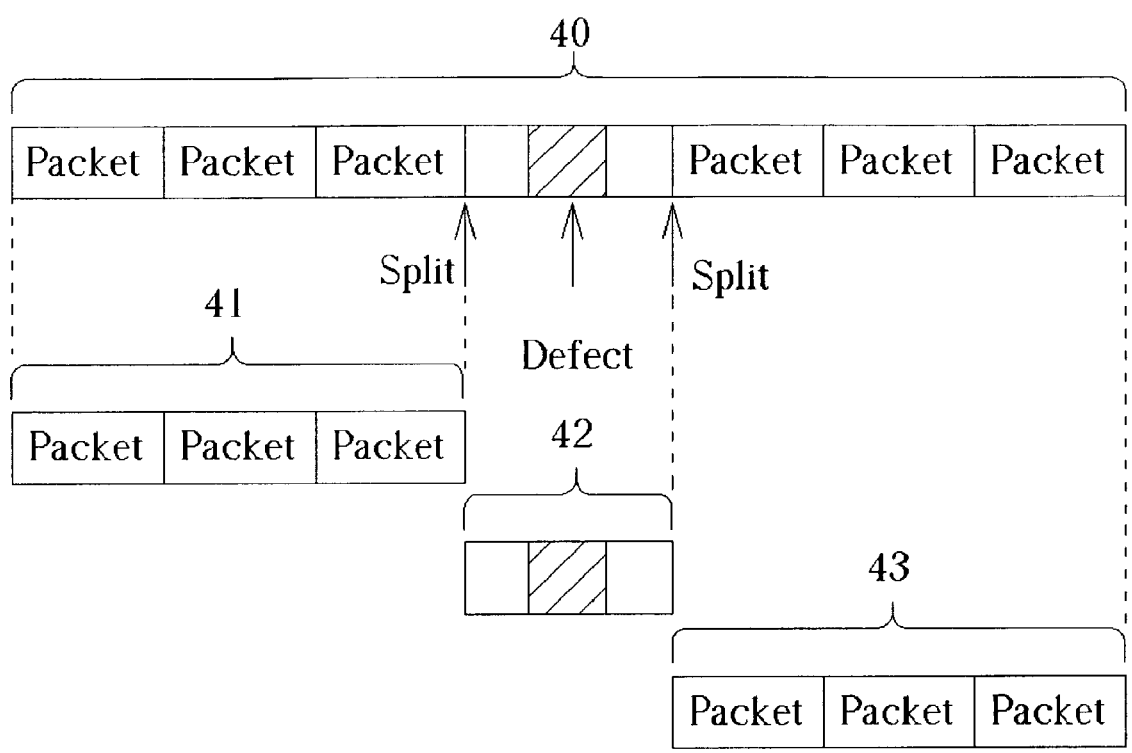
FIG. 4 shows a range split of a defect packet range having a defect block.

Referring to FIG. 2 to FIG. 4, the defect blocks are utilized to identify a plurality of corresponding breakpoints in the write packet range 20. Afterward, the write packet range is split into several sub-ranges in different types such as a complete packet range, a partial packet range, and a defect packet range. If a write packet range 20 has all wholly continuous packets and has no defect blocks, then it is split into two sub-ranges based on an SA as a breakpoint as is shown in FIG. 2. Each of the sub-ranges is defined as a complete packet range such as a write length 21 and a write length 22 in FIG. 2. If a write packet range 30 has a partial packet and has no defect blocks, then it is split into a partial packet range 31 with a packet length of 1 and a complete packet range 32 based on the partial packet as a breakpoint as is shown in FIG. 3. If a write packet range has a defect packet with defect blocks, then it is split into a defect packet range 42 with a packet length of 1 and two complete packet ranges 41 and 43 based on the defect packet as a breakpoint as is shown in FIG. 4.

Thereafter, if a sub-range is identified as a complete packet range, the corresponding data is written directly to each packet in the complete packet range. If a sub-range is identified as a partial packet range, the original partial packet is retrieved first and then the corresponding write blocks in the partial packet are replaced to generate a write packet. Then, the entire modified write packet can be written back over the original partial packet. If a sub-range is identified as a defect packet range, a replace packet in an SA is retrieved first and then the corresponding write blocks in the replace packet is replaced to generate a modified replace packet. Next, the modified replace packet is written back to the SA. After all the sub-ranges of the write packet range are processed sequentially, the entire writing procedure for the CD-MRW is finished.

Figure 5:
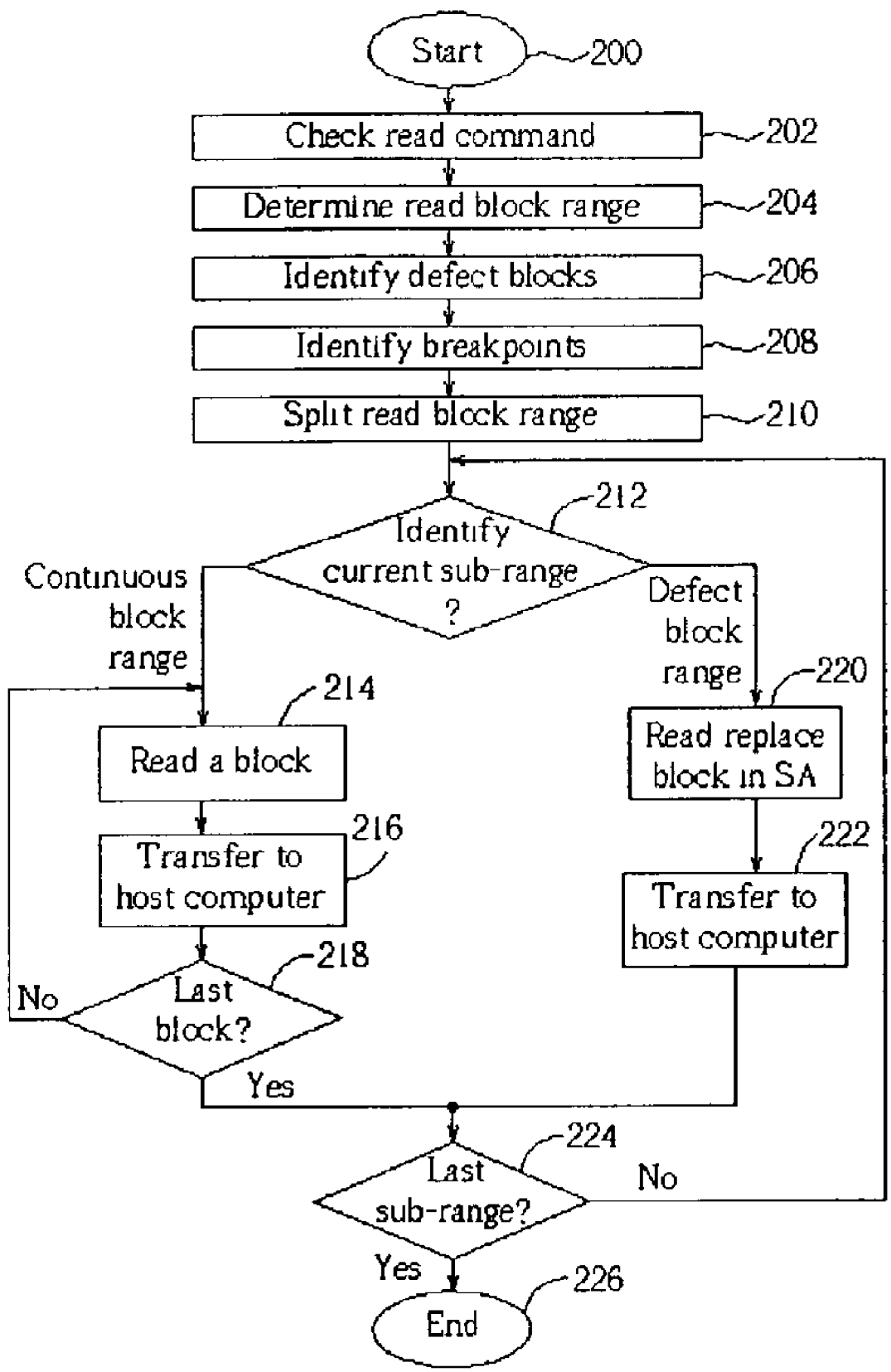
FIG. 5 shows a flowchart of a reading method for a CD-MRW according to the preferred embodiment of the present invention.

Please refer to FIG. 5. The reading method for a CD-MRW, according to the preferred embodiment of the present invention, is shown in FIG. 5. After receiving a read command by the host computer, the host computer first determines a read block range. The read range is based on a block as a range unit because a block is the smallest reading unit. Next, a plurality of defect blocks related to the read block range is identified through an MDT. The defect blocks are then utilized to identify corresponding breakpoints in the read block range. Thereafter, the read block range is split into several types of sub-ranges such as a continuous block range and a defect block range. The reading method of FIG. 5 is summarized as follows:

Step 200: Start;

Step 202: Check a read command, and verify that it is valid and has no errors;

Step 204: Determine a read block range of the data;

Step 206: Identify any defect blocks in the read block range;

Step 208: Identify breakpoints in the read block range based on the defect blocks;

Step 210:

Split the read block range into at least two sub-ranges based on the breakpoints;

Step 212:

Identify the current sub-range. If the sub-rage is a continuous block range, go to step 214. If the sub-range is a defect block range, go to step 220;

Step 214:

The sub-range is a continuous block range. Read a block in the continuous block range;

Step 216: Transfer data of the block to the host computer;

Step 218:

Is this the last block to be read? If this is the last block to be read, go to step 224. If this is not the last block to be read return, to step 214;

Step 220: The sub-range is a defect block range. Read a replace block in an SA;

Step 222: Transfer data of the replace block to the host computer;

Step 224:

Is this the last sub-range to be read? If this is the last sub-range, go to step 226. If this is not the last sub-range return, to step 212;

Step 226: End.

Figure 6:
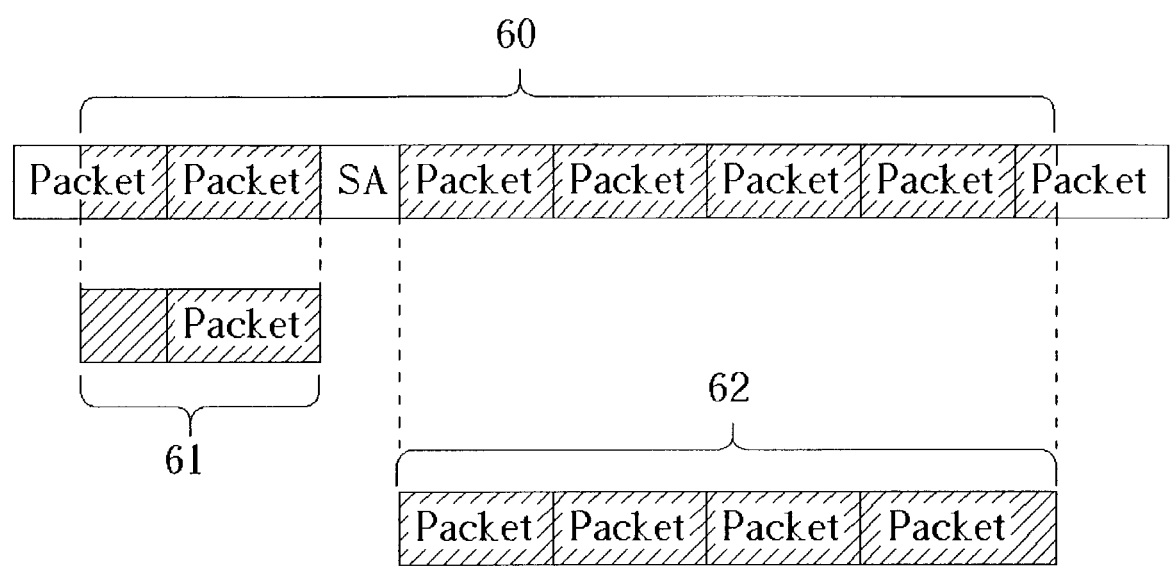
FIG. 6 shows a range split of a continuous block range having an SA.
Figure 7:
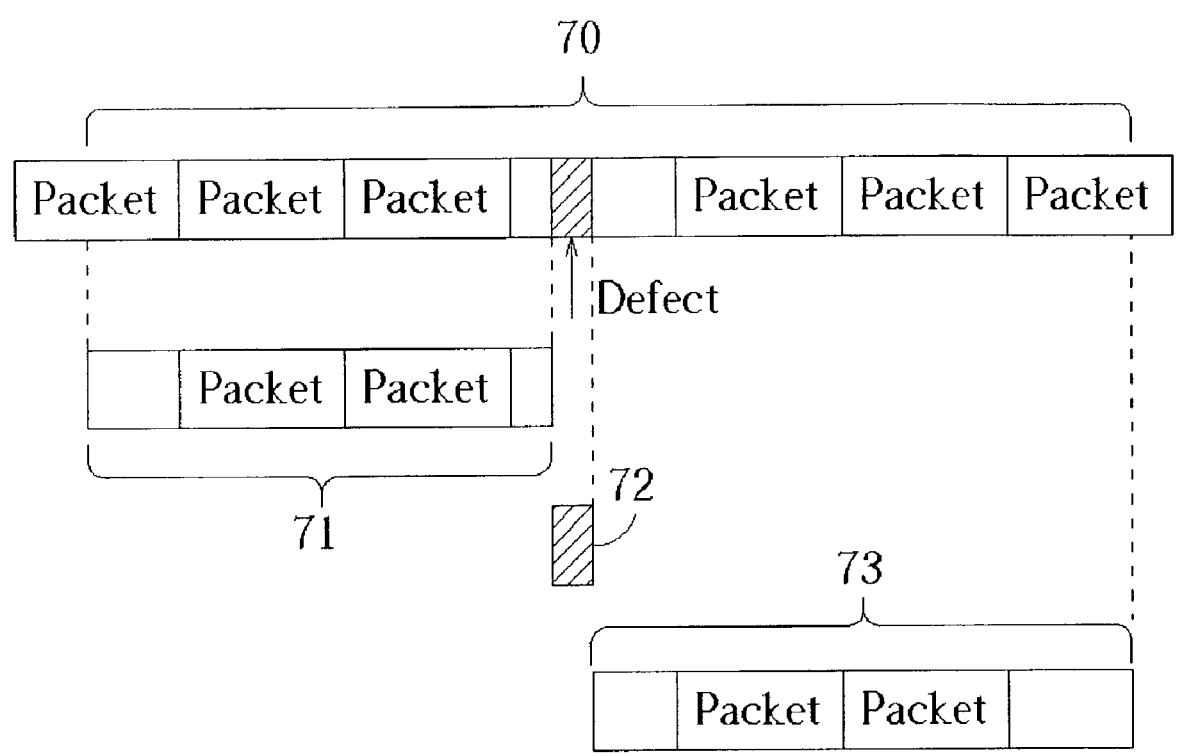
FIG. 7 shows a range split of a defect block range having a defect block.

Referring to FIG. 6 and FIG. 7, if a read block range 60 has an SA and has no defect blocks, then it is split into two sub-ranges based on the SA as a breakpoint as is shown in FIG. 6. Each of the sub-ranges is defined as a continuous block range such as a transfer length 61 and a transfer length 62 as shown in FIG. 6. If a read block range 70 has a defect block, then it is split into a defect block range 72 with a block length of 1 and two continuous block ranges 71 and 73 based on the defect block as a breakpoint as is shown in FIG. 7.

Thereafter, if a sub-range is identified as a continuous block range, each block is read and transmitted to the host computer sequentially throughout the whole continuous block range. If a sub-range is identified as a defect block range, the replace block in the corresponding SA is read and transmitted to the host computer. After all the sub-ranges of the read block range are processed consecutively, the reading procedure for the CD-MRW is finished.

Compared to the traditional read/write methods for a CD-MRW, the read/write methods of the present invention split a read-block or write-packet range into several sub-ranges to simplify the complexity of the related read/write procedures and reduce the required capacity of DRAM buffer for the read/write procedures of the CD-MRW.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A writing method for CD-MRW comprising:
   (a) obtaining data to be written to a CD-MRW substrate;
   (b) determining a write packet range of the data;
   (c) after completing step (b), identifying any defect blocks in the write packet range;
   (d) after completing step (c), identifying breakpoints in the write packet range based on the defect blocks;
   (e) after completing step (d), splitting the write packet range into at least two sub-ranges based on the breakpoints; and
   (f) after completing step (e), individually writing each sub-range.

2. The method of claim 1 wherein the sub-ranges comprise:
   a continuous packet range located in a data area (DA), the continuous packet range having no defect blocks; and
   a defect packet range having a defect block;
   wherein different sub-ranges are processed by different writing procedures.

3. The method of claim 2 wherein the continuous packet range further comprises:
   a complete packet range having wholly continuous packets; and
   a partial packet range;
   wherein different continuous packet ranges are processed by different writing procedures.

4. The method of claim 3 wherein the writing procedure of the complete packet range comprises:
   overwriting each packet of the complete packet range directly.

5. method of claim 3 wherein the writing procedure of the partial packet range comprises:
   (a) reading an original partial packet;
   (b) replacing corresponding write blocks in the original partial packet to generate a write packet; and
   (c) writing the entire write packet back over the original partial packet.

6. The method of claim 2 wherein the writing procedure of the defect packet range comprises:
   (a) reading a replace packet in a spare area (SA);
   (b) replacing corresponding write blocks in the replace packet to generate a modified replace packet; and
   (c) writing the modified replace packet back to the SA.

7. The method of claim 1 wherein the writing method further comprises:
   identifying any SAs in the write packet range; and
   identifying the breakpoints based on the SAs in the write packet range.

8. The method of claim 1 wherein the breakpoint indicates a packet having a defect block.

9. The method of claim 1 wherein the breakpoint is an SA.

10. The method of claim 1 wherein the breakpoint is a partial packet.

11. The method of claim 1 wherein the breakpoint is a packet having a defect block.

12. A reading method for CD-MRW comprising:
    (a) determining a read block range of the data;
    (b) after completing step (a), identifying any defect blocks in the read block range;
    (c) after completing step (b), identifying breakpoints in the read block range based on the defect blocks;
    (d) after completing step (c), splitting the read block range into at least two sub-ranges based on the breakpoints; and
    (e) after completing step (d), individually reading each sub-range.

13. The method of claim 12 wherein the sub-ranges comprise:
    a continuous block range located in a DA, the continuous block range having no defect blocks; and
    a defect block range having a defect block;
    wherein different sub-ranges are processed by different reading procedures.

14. The method of claim 13 wherein the reading procedure of the continuous block range comprises:
    (a) reading a block in the continuous block range; and
    (b) transferring data of the block to a host computer.

15. The method of claim 13 wherein the reading procedure of the defect block range comprises:
    (a) reading a replace block in an SA; and
    (b) transferring data of the replace block to a host computer.

* * * * *